April 27, 1943.  J. A. REITH  2,317,346
SAFETY BELT
Filed April 25, 1941

INVENTOR.
JOSEPH A. REITH.
BY John W. Michael
ATTORNEY.

Patented Apr. 27, 1943

2,317,346

UNITED STATES PATENT OFFICE 2,317,346

SAFETY BELT

Joseph A. Reith, Milwaukee, Wis., assignor to Milwaukee Safety Appliance Co., Milwaukee, Wis., a corporation of Wisconsin Application April 25, 1941, Serial No. 390,234

7 Claims. (Cl. 227—49)

This invention relates to improvements in safety belts and body harnesses, and the couplings therefor, particularly adapted for use by window cleaners, linesmen, and the like.

It is conventional practice with safety belts of this type to change the usual ropes or cables at predetermined intervals of time. In the old type of harness employing one-piece closed chocks or hanger blocks such change was difficult and required a great deal of time and skill. Hence, one of the objects of this invention is to provide a safety belt of the type described, the attaching ropes or cables of which may be quickly and safely substituted without requiring a great deal of time or more skill than is ordinarily possessed by the users of such belts.

Another object of the invention is to provide couplers for the attaching ropes or cables which are easily engageable and disengageable with the anchor terminals on the window frame, and yet when engaged are prevented from becoming disengaged except by wilful manipulation of the user.

A still further object of the invention is to provide connections between the couplers and the ends of the attaching ropes or cables, which permit of great flexibility and ease in manipulating the couplings while preventing excessive wear on the ends of the attaching ropes or cables.

The foregoing objects are accomplished by providing closed chocks or hanger blocks which are formed of two pieces. The cover or closing piece is removable upon the disengagement of a fastening bolt or the like to permit the attaching cable or rope to be removed laterally from the rope-receiving opening in the closed chock. The coupling member is provided at the entrance of the anchor terminal-retaining slot with a spring-biased keeper which prevents the coupling from sliding off the anchor terminal except when the keeper is opened against the force of the spring by manual manipulation. By providing an 8-shaped coupling link between the ends of the attaching ropes or cables and the coupling, great freedom of manipulation of the coupler is obtained without any excessive wear on the rope as the result of the manipulation.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1:
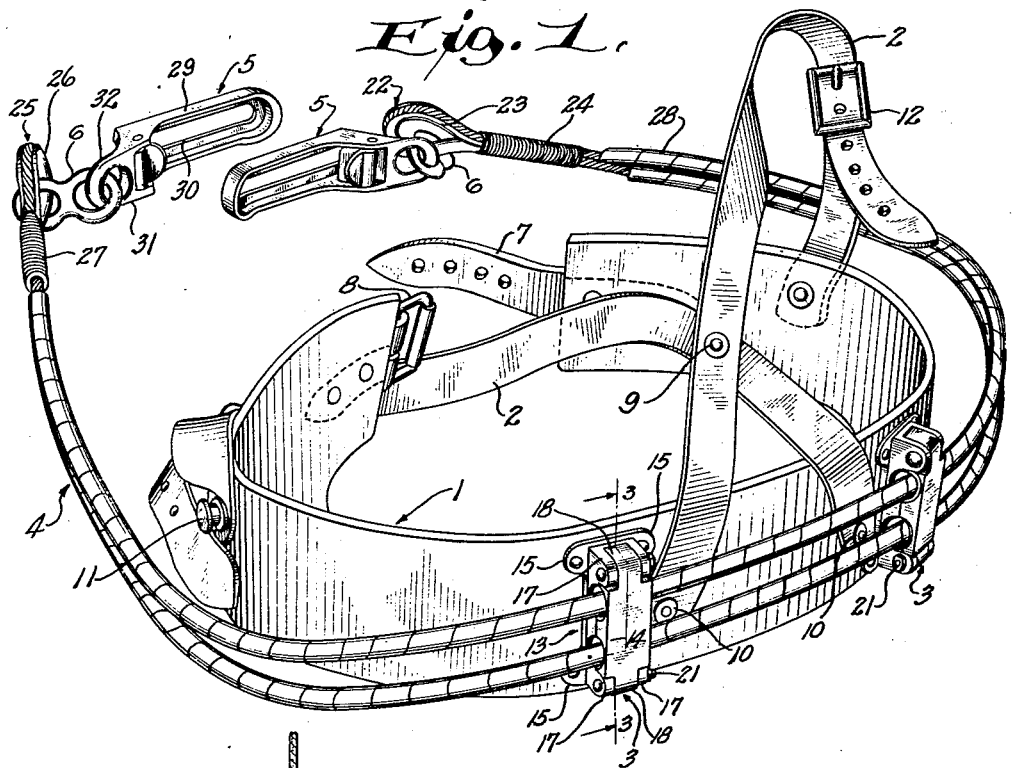
Figure 1 is a view in perspective of a safety belt, attaching ropes, connecting links, and couplings embodying the invention.

Referring in greater detail to the drawing, the safety belt comprises generally a waist-encircling belt 1, a pair of crossed shoulder straps 2—2 to aid in holding the belt in place, two closed chocks or hanger blocks 3—3 fastened at spaced intervals intermediate the ends of the belt 1, and an attaching rope or cable 4 slidably held in the chocks 3 to each end of which is connected a coupling 5 by means of figure-8 links 6.

The waist-encircling belt 1 is relatively wide and formed of heavy leather or other suitable material. To one end of the belt 1 is riveted or otherwise secured a tongue 7 having a series of perforations therein. On the other end of the belt there is mounted a buckle 8 of drop forged design which engages with the openings in the tongue 7 to adjustably attach the belt about the body of the wearer. The shoulder straps 2 are crossed in the back of the wearer and are riveted together as indicated at 9. The rear ends of straps 2 are secured at spaced points on the central portion of the belt by rivets, as indicated at 10. The other ends of said straps are secured adjacent the open end of the belt by means of out-of-use retaining studs 11 which have reduced rivet-like portions. The shoulder straps 2 are adjustable by having incorporated in each a buckle 12.

Figure 3:
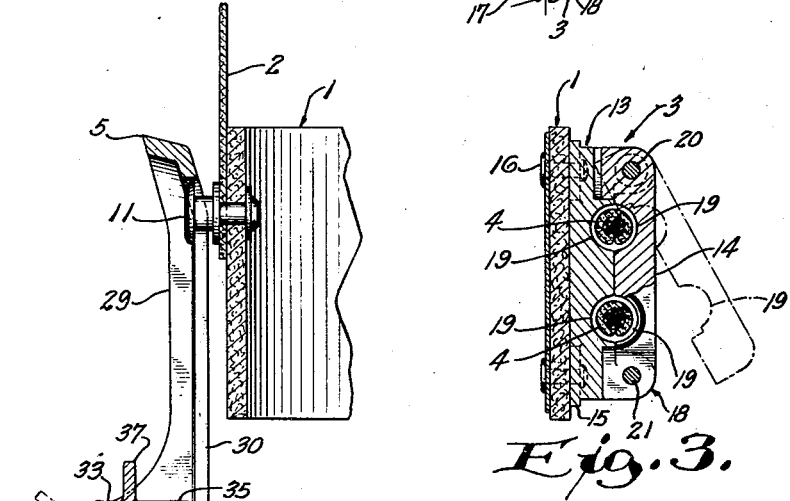
Figure 3 is a sectional view of the two-piece closed chock or hanger taken on the line 3—3 of Figure 1.

The closed chocks or hanger blocks 3 are identical in construction, and the description will be limited to one. Each comprises a base portion 13 and a closing member 14. The base member 13 is provided with laterally extending ears 15 at each corner thereof. The ears 15 have apertures by means of which the base member 13 is riveted to the belt 1, as indicated at 16. The base member 13 is also provided at its four corners with upstanding spaced lugs 17. The lugs 17 are apertured to receive pivot pins and bolts, as hereafter described. The closure member 14 has extending tongues 18 which fit within the upstanding lugs 15 of the base member 13. The tongues 18 also have apertures which are in alinement with the apertures in the lugs 17 when the closure member 14 is flush against the base member 13. Each of the members 13 and 14 have complemental grooves 19 extending laterally therethrough, the cross sections of which are substantially semi-circular. The closure member 14 is permanently pivoted to the base member 13 by a pivot pin 20 passing through the apertures in the upper of lugs 17 and tongue 18. The depth of the spacing between the lugs 17 is sufficient to permit member 14 to pivot about the rivet 20 to the position indicated by the broken line in Figure 3. In this position the attaching ropes 4 may be removed laterally from the grooves 19 and hence from the confines of the chock 3. A bolt and nut assembly 21 is inserted in the alined apertures of the lower of lugs 17 and tongue 18, when the closure member 14 is swung into flush engagement with the base member 13 to rigidly hold it in place. With the closure member closed while the attaching ropes 14 are positioned in the grooves 19, the circular openings formed by the complemental relationship of the grooves 19 are sufficiently large so that the rope is free to move longitudinally through the chock but is still held to the belt 1. In place of the bolt and nut assembly a pivot pin similar to pivot pin 20 may be used and held in place by peening over an amount sufficient to hold it in place yet permitting it to be driven out when a change of ropes is required.

The attaching rope or cable 4 comprises a flexible multi-strand wire cable so doubled as to form a bight 22 at substantially its center portion. In this bight 22 is positioned a thimble 23. The reaches of the rope immediately adjacent this bight are lashed together by binding 24 to permanently hold the bight and thimble 22 in position. One of the reaches of the rope 4 is sufficiently longer than the other so that a bight 25 may be formed therein and a similar thimble 26 positioned in this bight. The end of the longer reach is then spliced or married to the end of the shorter reach. This splice is placed immediately adjacent the thimble 26 and the spliced and the unspliced reaches are then lashed together by binding 27 to permanently hold the bight 25 and thimble 26 in position. The rope 4 may be provided with a spirally wound leather cover 28 to protect the rope and belt from wear and also to prevent the rope from producing excessive wear in the rope-receiving grooves 19 of the closed chocks 3. It is to be understood that the cable can be made single instead of double, as shown. This is particularly true when flexible wire rope is used instead of manila rope. In such case bights are formed in each end of the cable by folding the end back on itself around the thimble and splicing the end into the body of the cable immediately adjacent the thimble. These splices can then be covered with lashing, the same as is done with the double cable. It is also possible to provide each end of the cable with a jaw end socket which is secured to the wire by swedging and soldering, or using a sleeve, wedge and socket terminal, such as is commercially known by the trade name "Fiege fittings" (see 1941 Catalog, Wilcox, Crittenden & Co., Inc.). The jaw end may then be directly coupled with the couplings.

Figure 2:
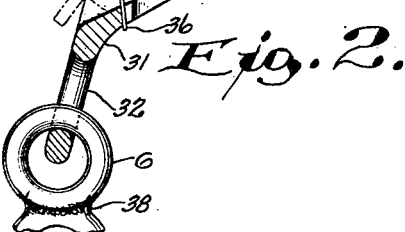
Figure 2 is an enlarged sectional fragmentary view of the coupling positioned on the out-of-use retaining stud fastened to the belt.

To each end of the rope 4 is connected a coupling 5. The couplings 5 are identical in construction and only one will be described. Each is formed with an elongated body portion 29, which is centrally recessed and flanged about the recess, as at 30. At the lower end, as viewed in Figure 2, the body portion 29 is provided with an angled extension 31 having an eye 32 formed therein. The flanges 30 are open at the lower end, as viewed in Figure 2, and provide an entrance for permitting the enlarged head of the usual anchor terminal (not shown) fastened to a window frame or other base to enter into the recessed portion of the coupling. The head of the terminal engages with the flanges 30 and holds the coupling in place on the terminal. In order to prevent the coupling 5 from sliding off the terminal, there is provided at the entrance a keeper 33. The keeper 33 is pivoted, as at 34, to the inner sides of the angled extension 31, and has a spring 36 urging it in clockwise position, as viewed in Figure 2. The keeper 33 has an elongated leg 35 which lies in the path of the head of a stud when the keeper is swung to its furthermost clockwise position by the action of the spring 36. When the coupling 5 is being placed on a terminal, the head thereof will urge the keeper in counterclockwise direction against the force in spring 36, and will permit the terminal to enter into the recessed body 29 of the coupling. Immediately after the head of the terminal passes from under the leg 35, the keeper 33 springs back to the position shown in full lines in Figure 2. In this position it is impossible to remove the coupling from the terminal as the leg 35 blocks the entrance. To permit the coupling to be removed, a thumb leg 37 is extended outwardly from and at substantially right angles to the leg 35. The leg 37 (while being generally unexposed) may be easily engaged by the thumb of the operator to rotate the keeper 33 in a counterclockwise direction against the force of spring 36 to swing the elongated leg 35 out of the entrance, as is shown in broken line in Figure 2, whereupon the coupling may be slid from the head of the terminal.

The couplings 5 are connected to the bights of the ropes 4 by means of figure-8 links 6. These links before assembly are generally S-shaped. One end is hooked into the bight of the cable and the other end through the eye 32 of a coupling 5. The free ends of the link are then bent around against the diagonal center bar and welded together, as at 38. The manipulation of the coupling 5 is made easy by the loose fit of link 6, and wear is thereby prevented on the cable at the bights.

The foregoing description makes clear the amount of time and skill required to prepare an attaching rope with its splices, links, and couplings, an act which had to be done with the old type harness and permanently closed chocks each time it was necessary to change the ropes. This invention contemplates the forming of the attaching rope 4, including couplings on each end thereof, as a completely assembled unit prepared in the factory and furnished to the user in such complete shape. The user of the safety belt has only to disengage the attaching bolt and nut 21 from each of the chocks 3, swing the closure member 14 away from the base member 13, laterally remove from the grooves 19 the attaching ropes 4, and laterally reinsert the new attaching rope. It is then only necessary to close the closure member 14 flush against the base member 13 and reinsert the connecting bolt and nut 21. If necessary, a lock washer may be inserted beneath the nut, or the end of the bolt may be peened over to prevent the nut from becoming loose. This eliminates the necessity for the user to make the splices and do the welding essential to changing ropes when the old style permanently closed chock is used.

Although there is shown and described a certain specific embodiment of the invention, many modifications thereof are possible. The invention is not to be restricted except in so far as is necessitated by the prior art and by the spirit of the appended claims.

I claim:

1. A safety harness comprising a belt, a rope-receiving closed chock secured to said belt, an attaching rope having coupling means for engaging anchor terminals, said rope being disposed in and freely slidable through said chock and said chock having a movable portion providing access thereto whereby said rope and said coupling means may be assembled upon or removed from said belt as a unit.

2. A safety harness comprising a belt, a two-piece rope-receiving closed chock secured thereto, an attaching rope having coupling means for engaging anchor terminals, said rope being disposed in and freely slidable through said chock, one of said chock pieces being detachable to provide access to said chock.

3. A safety harness comprising a belt, a closed chock comprising a base member secured to said belt and having a rope-receiving groove therein and a closure member detachably secured to said base member and having a rope-receiving groove therein cooperable with the rope-receiving groove of said base member to provide a rope-receiving opening, an attaching rope disposed in and freely slidable through said opening and provided with coupling means for engaging anchor terminals, and means for securing said closure member to said base member.

4. A safety harness comprising a belt, a closed chock comprising a base member secured to said belt and having a rope-receiving groove therein and a closure member detachably secured to said base member and having a rope-receiving groove therein cooperable with the rope-receiving groove of said base member to provide a rope-receiving opening, an attaching rope disposed in and freely slidable through said opening and provided with coupling means for engaging anchor terminals, and detachable means for securing said closure member to said base member.

5. A safety harness comprising a belt, shoulder straps attached to the belt for supporting the latter on the body of the wearer, means including coupling members carried by the belt for attachment to anchor terminals, the attachment of one end of said shoulder straps to the belt comprising rivets having upstanding studs formed thereon for supporting said coupling members when not in use.

6. In a safety harness comprising a belt and an attaching rope secured thereto, a coupling member for securing each end of said rope to an anchor terminal, each coupling member having a longitudinal slot therein adapted to receive said terminal, a spring actuated pivoted keeper permitting entrance to but obstructing passage from said slot, and manually operable means for swinging said keeper to non-obstructing position.

7. A safety harness for window cleaners and the like comprising a belt, means for supporting the same upon the body of a wearer, and means including a unitary cable and coupling assembly removably attached and detached as a unit to the belt for anchoring the same to a support.

JOSEPH A. REITH.